United States Patent [19]

Ruta

[11] Patent Number: 4,916,573
[45] Date of Patent: Apr. 10, 1990

[54] CONTROL CIRCUIT FOR A CIRCUIT INTERRUPTER

[75] Inventor: Joseph W. Ruta, Elmhurst, Ill.

[73] Assignee: S & C Electric Company, Chicago, Ill.

[21] Appl. No.: 223,742

[22] Filed: Jul. 15, 1988

Related U.S. Application Data

[63] Continuation of Ser. No. 791,195, Oct. 25, 1985, abandoned.

[51] Int. Cl.$^4$ .............................................. H02H 3/093
[52] U.S. Cl. .......................................... 361/93; 361/96; 361/110
[58] Field of Search .................................. 361/93–98, 361/110, 42–50, 111

[56] References Cited

U.S. PATENT DOCUMENTS

| | | | |
|---|---|---|---|
| 3,634,729 | 1/1972 | Hendry et al. | 361/96 |
| 3,831,061 | 8/1974 | Boyd | 317/36 |
| 4,002,950 | 1/1977 | Dickerson | 361/94 |
| 4,017,766 | 4/1977 | Vercellotti et al. | 361/94 X |
| 4,060,844 | 11/1977 | Davis et al. | 361/98 X |
| 4,104,691 | 8/1978 | Shimp et al. | 361/98 X |
| 4,114,089 | 9/1978 | Ahmed | 361/110 X |
| 4,152,744 | 5/1979 | Pang | 361/98 X |
| 4,193,104 | 3/1980 | Nercessian | 361/110 X |
| 4,200,897 | 4/1980 | Dawley | 361/110 X |
| 4,219,858 | 8/1980 | DePuy et al. | 361/93 |
| 4,258,403 | 3/1981 | Shimp | 361/42 |
| 4,297,741 | 10/1981 | Howell | 361/93 |
| 4,347,541 | 8/1982 | Chen et al. | 361/50 |
| 4,442,472 | 4/1984 | Pang et al. | 361/97 X |
| 4,464,709 | 8/1984 | Barter | 361/98 X |
| 4,544,981 | 10/1985 | Hakoopian | 361/95 |
| 4,567,540 | 1/1986 | Ruta | 361/98 X |
| 4,571,658 | 2/1986 | Ruta | 361/96 |
| 4,571,659 | 2/1986 | Demeyer et al. | 361/97 X |
| 4,587,590 | 4/1986 | Bala et al. | 361/94 |
| 4,589,073 | 5/1986 | Kidd | 361/93 X |
| 4,597,025 | 6/1986 | Rutchiz et al. | 361/94 |
| 4,605,982 | 8/1986 | Harner et al. | 361/94 |

OTHER PUBLICATIONS

Keders et al., "A Current—Limiting Device for Service Voltages up to 34.5 kV", presented at the IEEE PES Summer Meeting, Portland, OR, Jul. 18–23, 1976.

(List continued on next page.)

Primary Examiner—William M. Shoop, Jr.
Assistant Examiner—A. Jonathan Wysocki
Attorney, Agent, or Firm—James V. Lapacek

[57] ABSTRACT

A control circuit is provided for a circuit interrupter that achieves an inverse-time characteristic for overcurrents that include instantaneous current levels higher than the interrupting capability of the circuit interrupter by synchronizing the operation of the circuit interrupter to ensure that circuit interruption takes place when the instantaneous current is within the interrupting capability of the circuit interrupter. This interrupting capability is similar to let-through current and is defined by the instantaneous magnitude of the current at the time of interruption or at a particular stage thereof. The control circuit is responsive to a time-current characteristic signal generator that provides a time-current signal in response to overcurrent after the passage of a time delay that is inversely related to the overcurrent. The control circuit utilizes the time-current signal to permit asynchronous operation of the circuit interrupter when the peak of the overcurrent is expected to be within the interrupting capabilities of the circuit interrupter and to control operation of the circuit interrupter in a manner synchronized with the overcurrent when the peak of the overcurrent is expected to exceed the interrupting capabilities of the circuit interrupter; the interruption in the synchronized manner being arranged to occur when the instantaneous current is within the interrupting capabilities of the circuit interrupter. If such overcurrents are predicted, the rate of change of the current and the instantaneous current being within a predetermined current range are utilized to synchronize operation of the circuit interrupter.

18 Claims, 5 Drawing Sheets

OTHER PUBLICATIONS

Bottger, "The Application of Is—Limiters in Three Phase Systems", pp. 1-7, 1967, Calor—Emag Company, Germany.

Calor—Emag Company, Leaflet No. 1197/6E, "Fault Levels Too High?", 2 pages, date unknown.

Blythe, M. C., "Limiting Fault Currents Between Private and Public Networks", 4 pages, Oct. 5, 1973, reprinted from Electrical Review, Calor—Emag.

Kroon, P. J., "The Development and Application of a 69 kV Fault Current Limiter", pp. 237–244, Apr. 1, 1971, 7th IEEE/PES Transmission and Distribution Conference and Exposition.

"Pyristor Pyrotechnic Systems", Carbone Ferraz, Inc. brochure, date unknown.

"Prototype Fault Current Limiter", EPRI Report, EL—1396, May 1980, title page through p. 2—3, and pp. 7—1 to 7—19, and 8—1.

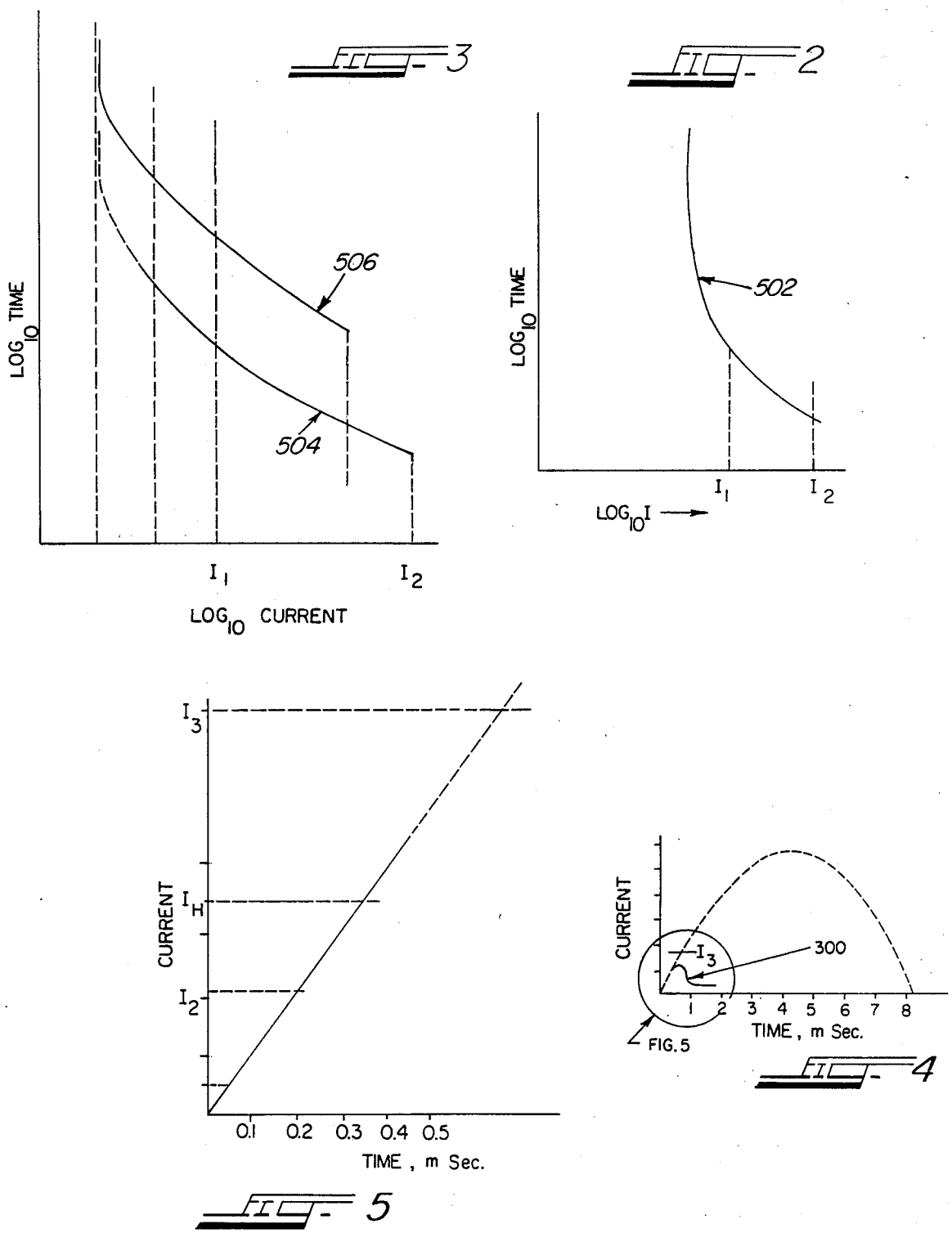

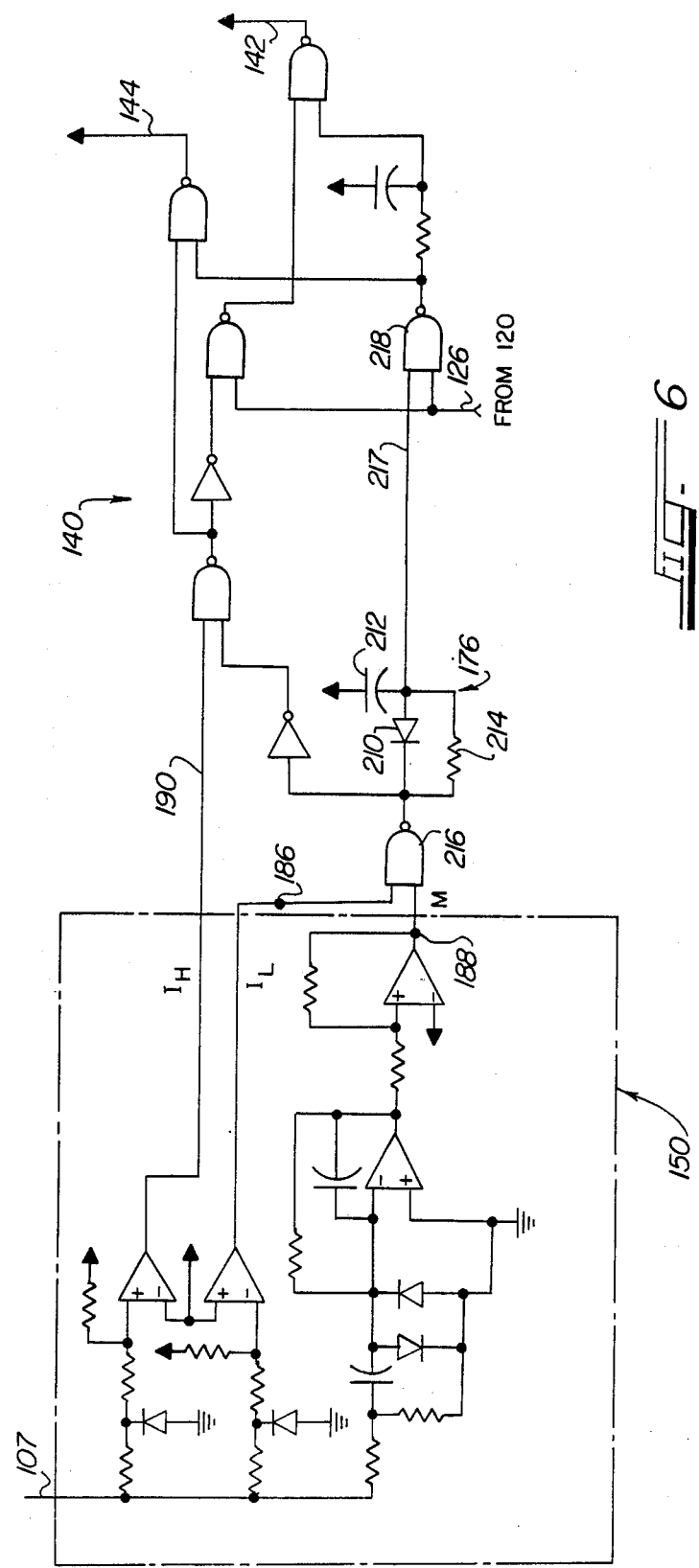

CONTROL CIRCUIT FOR A CIRCUIT INTERRUPTER

This is a continuation of application Ser. No. 791,195, filed Oct. 25, 1985 (now abandoned).

CROSS-REFERENCE TO RELATED APPLICATIONS

This application is directed to improvements in the control circuits disclosed and claimed in commonly-assigned, copending U.S. application Ser. Nos. 506,942 and 506,944 filed on June 22, 1983 and 658,239 filed on Oct. 3, 1984 in the name of J. W. Ruta. In a preferred arrangement, this application utilizes the current-sensing arrangement disclosed and claimed in copending, commonly-assigned U.S. patent application Ser. No. 791,199 filed Oct. 25, 1985 in the name of J. W. Ruta.

BACKGROUND OF THE INVENTION

1. Field of the Invention

The present invention relates to an electrical control circuit for generating signals to operate a circuit interrupter in a line carrying alternating current and, more specifically, to a circuit for generating a trip signal in accordance with a predetermined time-current characteristic and for initiating the interruption of overcurrent at a time when the instantaneous current is within the interrupting capability of the circuit interrupter at the time of interruption for overcurrents which have instantaneous values greater than the interrupting capability of the circuit interrupter.

2. Description of the Related Art

Various control circuits are known in the prior art for controlling circuit interrupters upon the occurrence of overcurrent conditions; i.e. currents which are greater than the highest desirable operating current in an alternating current line. For example, the following references disclose various combinations of short-time, long-time, and instantaneous trip circuits: Boyd, U.S. Pat. No. 3,831,061; Pang et al, U.S. Pat. No. 4,442,472; Chen et al, U.S. Pat. No. 4,347,541; Howell, U.S. Pat. No. 4,297,741; and Shimp, U.S. Pat. No. 4,258,403. The Howell reference, U.S. Pat. No. 4,297,741, utilizes an iron core transformer for providing current signals to long-time and short-time trip circuits. An air core transformer is utilized to develop signals proportional to the rate of change of the current as an input to an instantaneous trip circuit. Additionally, the following references relate to various protection arrangements utilizing, for their operation, the rate of change of current (di/dt) or the rate of change of current in combination with one or more current levels: Keders et al, "A Current-Limiting Device for Service Voltages Up to 34.5 kV", July 18, 1976, 7 pages, IEEE PES Summer Meeting, Paper No. 76436-6; Bottger, "The Application of Is-Limiters in Three Phase Systems", pages 1-7, 1967, Calor-Emag Company, Germany; Calor-Emag Company, Leaflet No. 1197/6E, "Fault Levels Too High?", 2 pages, date unknown; M. C. Blythe, "Limiting Fault Currents Between Private and Public Networks", 4 pages Oct. 5, 1973, reprinted from Electrical Review, Calor-Emag; P. J. Kroon, "The Development and Application of a 69-kV Fault Current Limiter", pages 237-244, Apr. 1, 1971, 7th IEEE/PES Transmission and Distribution Conference and Exposition; "Pyristor Pyrotechnic Systems", Carbone Ferraz, Inc. brochure, date unknown; and "Prototype Fault Current Limiter", EPRI Report, EL-1396, May 1980, pages 7-1 to 7-19, 8-1, Palto Alto, Calif.

While these arrangements may be generally suitable for their intended purposes, prior protection arrangements operating in accordance with a time-current characteristic including inverse-time portions have only been capable of operation for overcurrents that have maximum current levels within the interrupting capabilities of the circuit interrupter as defined in terms of the instantaneous magnitude of the current at the time of interruption.

SUMMARY OF THE INVENTION

Accordingly, it is a principal object of the present invention to provide a control circuit for a circuit interrupter that provides operation in accordance with a time-current characteristic that includes inverse-time properties for overcurrents that have current levels that exceed the maximum interrupting capabilities of the controlled circuit interrupter; the maximum interrupting capabilities of the circuit interrupter being defined by the instantaneous magnitude of the current at the time of interruption or at a particular stage thereof.

It is another object of the present invention to provide a control circuit for a circuit interrupter having a maximum current-interrupting capability of I, the control circuit providing a time-current characteristic that is inversely related to the overcurrent and the control circuit synchronizing operation of the circuit interrupter for the interruption of overcurrents which may have instantaneous current levels greater than I.

It is a further object of the present invention to control the operation of a circuit interrupter in accordance with predetermined time-delay properties of a time-current characteristic for overcurrents that are not predicted to include instantaneous current levels above a current level I which does not exceed the interrupting capabilities of the circuit interrupter which are characterized by the instantaneous magnitude of the current at the time of interruption, and to control the operation of the circuit interrupter according to a time-current characteristic for overcurrents that are predicted to include instantaneous current levels above I in an appropriate manner to effect interruption when the overcurrent is within the maximum interrupting capabilities of the circuit interrupter.

These and other objects of the present invention are efficiently achieved by a control circuit for a circuit interrupter that achieves an inverse-time characteristic for overcurrents that include instantaneous current levels higher than the interrupting capability of the circuit interrupter by synchronizing the operation of the circuit interrupter to ensrue that circuit interruption takes place when the instantaneous current is within the interrupting capability of the circuit interrupter. This interrupting capability is similar to let-through current and is defined by the instantaneous magnitude of the current at the time of interruption or at a particular stage thereof. This instantaneous interrupting capability is not to be confused with the interrupter rating of the interrupter device which relates to the maximum available rms current for which the interrupter device is rated. The control circuit is responsive to a time-current characteristic signal generator that provides a time-current signal in response to overcurrent after the passage of a time delay that is inversely related to the overcurrent. The control circuit utilizes the time-current signal to permit asynchronous operation of the circuit interrupter when the peak of the overcurrent is expected to be within the interrupting capabilities of the circuit interrupter and to control operation of the circuit interrupter in a manner synchronized with the overcurrent when the peak of the overcurrent is expected to exceed the interrupting capabilities of the circuit interrupter; the interruption in the synchronized manner being arranged to occur when the instantaneous current is within the interrupting capabilities of the circuit interrupter. In a preferred arrangement, the rate of change of the current and the instantaneous current level are utilized to decide if the overcurrent will exceed the interrupting capabilities of the circuit interrupter. If such overcurrents are predicted, the rate of change of the current and the instantaneous current being within a predetermined current range are utilized to synchronize operation of the circuit interrupter.

BRIEF DESCRIPTION OF THE DRAWING

The invention, both as to its organization and method of operation, together with further objects and advantages thereof, will best be understood by reference to the following specification taken in conjunction with the accompanying drawing in which like reference numerals refer to like elements and in which:

FIGS. 2 and 3 are diagramatic representations of various time-current characteristic relationships that exemplify the operation of the control circuit of FIG. 1;

FIGS. 4 and 5 are diagramatic representations of an overcurrent waveform illustrating operational parameters of the present invention, FIG. 5 being a portion of FIG. 4 on an enlarged scale; and FIG. 6 is a schematic and logic diagram of the parameter signal generator and the decision circuit of FIG. 1.

DETAILED DESCRIPTION

Figure 1:
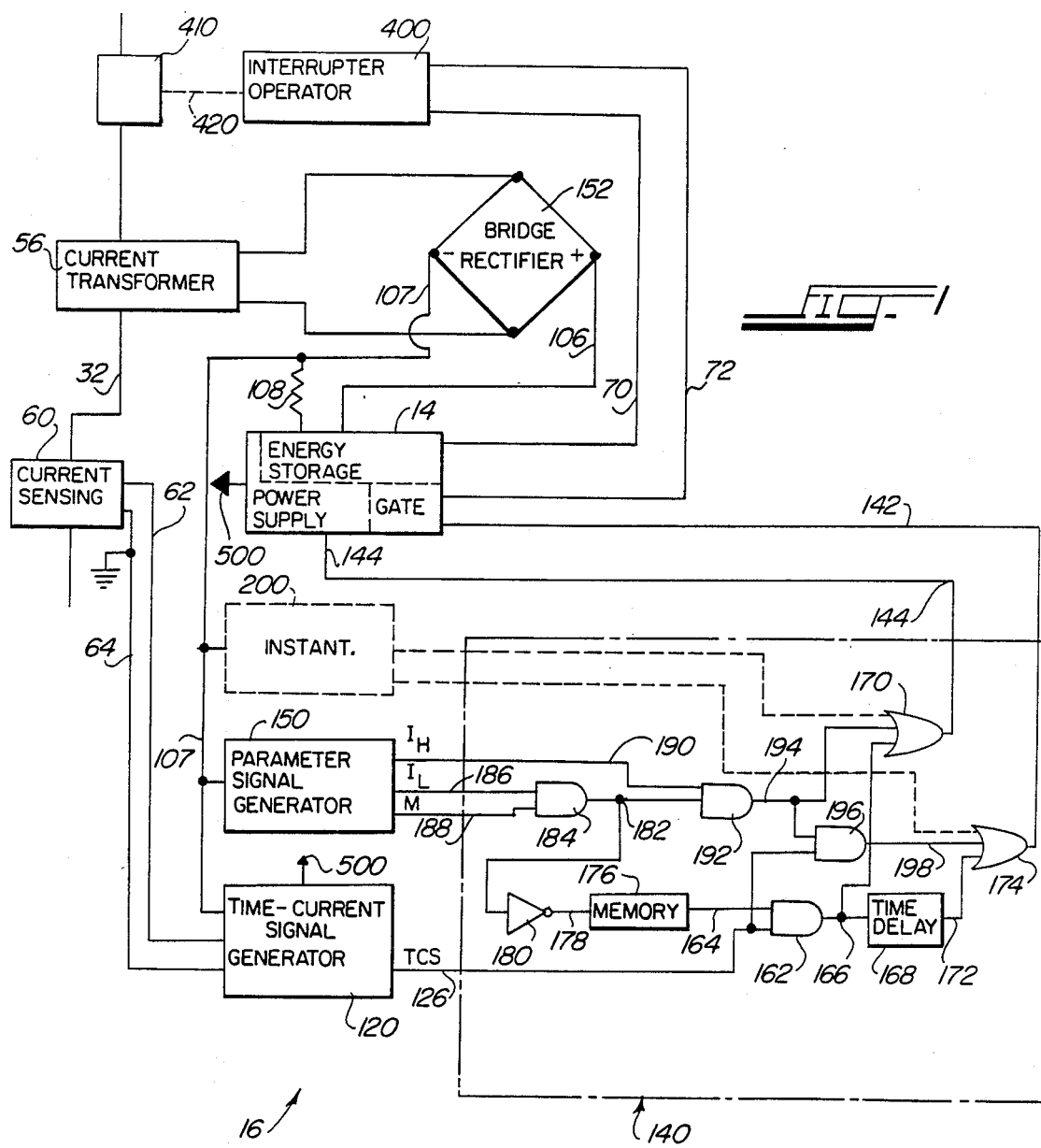
FIG. 1 is a block, logic, and schematic diagram of the control circuit of the present invention for operating the illustrated interrupter operator and circuit interrupter.

Referring to FIG. 1, the present invention relates to a control circuit 16 that operates an interrupter operator 400 in response to overcurrent in a line 32 in accordance with a predetermined time-current characteristic. Several exemplary time-current characteristics are illustrated in FIGS. 2 and 3. Operation of the interrupter operator 400 causes the operation of a circuit interrupter 410 in the line 32, as illustrated by the dashed line 420. The interrupter operator 400 may be a power cartridge (gas generator), a solenoid, a relay, or an alarm. With additional reference to FIG. 4, in accordance with the present invention, each of the exemplary time-current characteristics of FIGS. 2 and 3 provides for interruption of over-currents in the line 32 which include instantaneous currents that are greater than the interrupting capabilities of the circuit interrupter $I_3$ (FIG. 4) as defined by the instantaneous magnitude of the overcurrent at the time of interruption or at a particular stage thereof. The overcurrent waveform of FIG. 4 is representative of the current $I_2$. For example, the log-log plot 502 of current versus time in FIG. 2 represents the interruption characteristic for overcurrents up to an upper RMS current $I_2$ that can be achieved utilizing a circuit interrupter that is capable of interruption operation only up to the peak current value $I_3$ that may occur in the presence of the RMS current $I_1$.

The control circuit 16 is responsive to signals representing the current in the line 32. In a preferred arrangement, a current transformer 56 and a full-wave bridge rectifier 152 produce on outputs 106 and 107 current signals proportional to the current in the line 32. As one skilled in the art will recognize, suitable means other than the current transformer 56 and the rectifier 152 may be used to provide signals proportional to the current in the line 32. In a preferred arrangement, an additional current-sensing arrangement 60 is also provided which produces on outputs 62 and 64 current signals proportional to the current in the line 32. However, it should be realized that the present invention may be practiced without the additional current-sensing arrangement 60.

The control circuit 16 also includes a power supply 14 of the type described in U.S. patent application Ser. No. 506,944, now U.S. Pat. No. 4,567,540 and a time-current signal generator 120 such as that described in U.S. patent application Ser. No. 658,239. The power supply 14 includes an energy storage circuit connected to the outputs 106 and 107 for storing energy derived from the current signals thereon. As illustrated in application Ser. No. 506,944, the power supply 14 further contains a switch circuit and an associated control circuit which maintain the amount of energy stored in the energy storage circuit within a first range when there is no overcurrent in the line 32. The stored energy powers a regulated power supply, which supplies operating power to other portions of the control circuit 16 as generally shown at 500 in FIG. 1. Stored energy within the first range is generally insufficient to reliably operate the interrupter operator 400 for current below $I_1$ in FIG. 2. When required, energy within a second, higher range is stored for this purpose. Energy within the second range is stored in the energy storage circuit of the power supply 14 only on an "as needed" basis, i.e., only when operation of the circuit interrupter 410 by the energy storage circuit is required. This enables the power supply 14 to operate within a lower energy range during steady state (non-overcurrent) conditions, which lengthens component life and improves circuit accuracy.

As described more fully in application Ser. No. 658,239, the time-current signal generator 120 responds to current signals on lines 107 and/or 62 which represent overcurrents in the line 32. When the time-current signal generator 120 receives a current signal at 107 and/or 62 representing overcurrent in the line 32, it applies a time-current signal (referred to as TCS signal hereinafter) at an output 126 after the passage of a time period inversely proportional to the difference between the overcurrent and the threshold current. The start of the time period is coincident with the onset of overcurrent in the line 32.

The power supply 14 controls the interrupter operator 400 over lines 70 and 72. A gate in the power supply 14 is operated by a trip signal on a line 142 such that the energy stored in the power supply 14 and the current in line 106 are applied to the interrupter operator. The power supply 14 is also responsive to signals on a stored energy control line 144 to increase the stored energy. As will be explained in more detail hereinafter and as set forth in application Ser. Nos. 658,239 and 506,944, for circuit interruption operation for overcurrents below $I_1$, the trip signal 142 is delayed after the TCS signal and with respect to the stored energy control signal at 144 to allow sufficient time for the power supply 14 to suitably increase the stored energy.

In accordance with important aspects of the present invention, the control circuit 16 also includes a decision circuit 140 that provides the trip signal at 142 to the power supply 14 and the energy storage control signal at 144 to the power supply 14. The decision circuit generates the signals 142 and 144 in response to the TCS signal at 126 and one or more instantaneous current parameters from a parameter signal generator 150. The decision circuit 140 is effective to allow generation of the trip signal 142 and the energy storage control signal 144 after the occurrence of the TCS signal 126 when the overcurrent in line 32 satisfies certain predetermined conditions that ensure that the peak overcurrent that may occur in the presence of the current $I_1$ rms (FIG. 2) is equal to or less than a predetermined current level $I_3$ (FIG. 4). The current $I_3$ in various arrangements is either equal to or less than the maximum interrupting capabilities of the interrupter device 410 as defined in terms of the instantaneous magnitude of the current at the time of interruption or at a particular stage thereof. For example, and referring now to FIGS. 4 and 5, a high overcurrent waveform is illustrated which may be representative of the current $I_2$ rms and includes instantaneous currents that are greater than $I_3$. If the decision circuit determines that the instantaneous current associated with an overcurrent may exceed $I_3$, upon the occurrence of the TCS signal at 126, the decision circuit 140 generates the energy storage control signal 144 and the trip signal 142 only when the instantaneous value of the overcurrent is appropriate for operation of the circuit interrupter 410, as determined by selected instantaneous characteristics of the line current. Accordingly, the decision circuit 140 allows random or asynchronous operation of the circuit interrupter 410 in response to the TCS signal at 126 when the peak overcurrent is within the capability of the circuit interrupter 410 and synchronizes the operation of the circuit interrupter 410 when the overcurrent may include values which are greater than the instantaneous capability of the circuit interrupter 410. In a preferred arrangement, the decision circuit 140 utilizes the instantaneous current level and the rate of change of the instantaneous current to decide when synchronous operation is required. Of course, it should be realized that in other specific arrangements, the current $I_1$ rms can be selected to be any desired level resulting in peak currents that are below the interrupting capabilities of the circuit interrupter defined in terms of the instantaneous magnitude of the current at the time of interruption.

Turning now to a specific configuration of a preferred arrangement of the decision circuit 140, the TCS (Time-Current Signal) at 126 is connected to one input of a 2-input AND gate 162. The second input of the AND gate 162 is connected to a memory signal 164 that represents whether or not an overcurrent greater than $I_3$ could have been present within a predetermined time interval. This predetermined time interval must be longer than the duration of a half-cycle of the line current. The output 166 of the AND gate 162 is connected to a time delay stage 168 and to one input of a 2-input OR gate 170. The output of the OR gate 170 provides the stored energy control signal 144. The output 172 of the time delay stage 168 is connected to one input of a 2-input OR gate 174. The output of the OR gate 174 provides the trip signal 142.

Accordingly, when the time-current signal generator 120 provides a TCS signal at 126, the stored energy control signal 144 is provided to the power supply 14 to increase the stored energy provided that the memory signal 164 is true. Further, if the peak overcurrent is predicted to be less than $I_3$, the trip signal 142 is provided to the gate in the power supply 14 after the delay time of the time delay stage 168; the delay time allowing time for the stored energy to be sufficiently increased to reliably operate the interrupter operator 400. The decision circuit 140 is also arranged to ensure that the peak ovecurrent is below $I_3$ for the trip signal 142 to be generated. This arrangement provides for operation of the interrupter operator 400 on a random or asynchronous basis provided that the peak overcurrent is below $I_3$. It should be realized that in specific arrangements where additional stored energy is not required, the time delay stage 168 is not required.

The memory signal 164 to the AND gate 162 is provided by a memory stage 176. The memory stage 176 receives an input 178 at the output of an inverter gate 180. The inverter gate 180 is driven at the output 182 of a 2-input AND gate 184. The AND gate receives an $I_L$ parameter at 186 and an M parameter signal at 188. The $I_L$ and M parameter signals are generated by the parameter signal generator 150. The parameters $I_L$ and M are chosen to predict that an overcurrent may include instantaneous values greater than $I_3$ when both M and $I_L$ are true. The parameter M represents a threshold value of the rate of change of the overcurrent (di/dt) such that when M is exceeded and the instantaneous current is at least $I_L$, it is predicted that an overcurrent exists which may exhibit peak currents greater than $I_3$ due to the presence of a sinusoidal waveform of $I_1$ ka rms. When such an overcurrent is predicted (i.e. may exist), the signal 178 to the memory stage 176 causes the memory 176 to provide a low, disabling signal at 164 which blocks the TCS signal 126 from passing through the AND gate 162 to the OR gate 170 or to the time delay stage 168. Thus, neither of the signals 142 or 144 is provided and asynchronous interrpution is prevented. The memory stage 176 further includes a timer function such that once an overcurrent condition is predicted that may exceed $I_3$, the signal at 164 is maintained in the disabling, low state for a predetermined time interval. Additionally, the memory stage 176 also includes an immediate reset function such that the signal at 164 is immediately placed in the disabling state whenever a high overcurrent condition is predicted; i.e. $I_L$ and M true.

Considering now the synchronous mode of operation of the decision circuit 140, whenever a high overcurrent condition is predicted (i.e. the possibility of peak instantaneous currents exceeding $I_3$), the TCS signal 126, when active, is gated to provide the signals at 142 and 144 in synchronism with the instantaneous current such that interruption is ensured at levels of instantaneous current that do not exceed $I_3$; i.e. the interruption capabilities of the circuit interrrpter 410 or other selected value. To this end, the $I_L$ and M parameter signals and an $I_H$ parameter signal are utilized to define an instantaneous synchronizing signal. Referring now to FIG. 5 which is a portion of FIG. 4 on an enlarged scale, the $I_H$ parameter corresponds to an instantaneous current level that is greater than $I_L$ and is chosen to ensure that interruption operation by the circuit interrupter 410 will take place at levels of instantaneous currents that do not exceed $I_3$; i.e. within the capabilities of the circuit interrupter. The level $I_H$ is chosen along with $I_L$ and M to predict this operation taking into account the overall operating parameters of the circuit interrupter 410, the interrupter operator 400, the gate in the power supply 14 and the maximum available fault current. The operating parameters include the operating time of the various devices. As shown in FIG. 4, the decision circuit 140 predicts that the overcurrent will exceed $I_3$ and interrupts the current in accordance with the waveform 300.

Considering the specific arrangement of the decision circuit 140 of FIG. 1, the $I_H$ signal at 190 is true when the instantaneous current does not exceed $I_H$. The $I_H$ signal at 190 is provided by the parameter signal generator 150 and is connected at one input of a 2-input AND gate 192. The second input of the AND gate 192 is connected to the output 182 of the AND gate 184, respesenting $I_L$ M. The output 194 of the AND gate 192, representing $I_L \cdot M \cdot I_H$ is connected to the second input of the OR gate 170. Additionally, the output 194 of the AND gate 192 is connected to one input of a 2-input AND gate 196. The second input of the AND gate 196 is connected to the TCS signal 126. The output 198 of the AND gate 196 is connected to the second input of the OR gate 174. Accordingly, when a TCS signal 126 is generated by the time-current signal generator 120, the $I_L \cdot M \cdot I_H$ condition must be true before the stored energy control signal at 144 and the trip signal at 142 are provided to initiate operation of the circuit interrupter 410. Since the TCS signal is generated asynchronously with respect to the period or perturbations of the overcurrent, the $I_L \cdot M \cdot I_H$ condition may be generated either before, after, or simultaneously with the TCS signal.

While the preferred arrangement of the control circuit 16 utilizes predictive parameters such as $I_L$, M and $I_H$ to control the synchronous operation of the circuit interrupter 410 after appropriate time delays in accordance with an inverse-type TCC, it should be realized that it is also possible in other specific embodiments to utilize only the instantaneous current level or other parameters derived from the instantaneous current to provide such synchronization. For example, $I_H$ may be utilized as the input to the memory 176 or to the AND gate 162. Further, $I_H$ may be used for the input at 199 to the OR gate 170. The choice of synchronizing parameters depends on the circuit application, the thermal and interruption capabilities of the circuit interrupter, the accuracy of the sensed signals, and the power requirements of the interrupter operator 400 versus the availability of stored energy in the power supply 14 and/or the available current in the line 106. In the preferred arrangement where the sensing current also supplies the operating power for the interrupter operator 40 and the control circuit 16, either directly or by energy storage, the saturation effects of the current transformer 56 at higher current levels between $I_1$ and $I_2$ renders level synchronizing via the sensed instantaneous current less than desirable due to possible ambiguities. The addition of the current sensing arrangement 60 in conjunction with the current transformer 56 enables appropriate level sensing of the overcurrent for the purposes of the Time-Current Signal Generator 120 throughout the range of operation thereof as explained in more detail in co-pending U.S. application Ser. No. 791,199 filed on Oct. 25, 1985 in the name of J. W. Ruta. However, it is relatively impractical to provide a current sensing arrangement that will provide accurate, unambiguous, instantaneous overcurrent magnitude in the range of desired operation, e.g. where $I_2$ is in the range of 10-40 ka rms. The decision circuit 140 via the energy storage control signal 144 also aids in providing adequate stored energy and a stable output at 500 for the situation where higher overcurrents are present corresponding to the range of $I_1$-$I_2$ but the saturation effects of the current transformer 56 reduce the available power for energy storage and may cause loss of regulation at 500.

Further, it should also be realized that in other arrangements of the present invention, the control circuit 16 is provided with an instantaneous signal generator 200 as set forth in U.S. Pat. No. 4,571,658 and/or the time-current signal generator 120 that includes the range selection features set forth in U.S. Pat. No. 4,571,658 and application Ser. No. 658,239. For example and referring now to FIG. 3, the exemplary time-current characteristic 504 and 506 are provided. These time-current characteristics are exemplary and it should be realized that various other TCC curves may also be provided in accordance with the techniques of the present invention. In arrangements where an instantaneous TCC portion is provided along with inverse-time TCC portions, one or more of the parameters $I_L$ and $I_H$ may be provided to the decision circuit 140 from the instantaneous trip signal generator 200 dependent on the particular TCC portion and the TCC that is desired.

Referring now additionally to FIG. 6, a specific embodiment of the decision circuit 140 and the parameter signal generator 150 is illustrated that provides the various signals and parameters as discussed hereinbefore in connection with FIGS. 1–3. For example, the memory stage 176 is implemented by the diode 210, the capacitor 212, and the resistor 214. The cathode of the diode 210 is connected to the output of the a 2-input NAND gate 216; the NAND gate 216 performing the logic function of the AND gate 184 and the inverter 180. The anode of the diode 210 is connected to the input 217 of a 2-input NAND gate 218. The resistor 214 is connected across the diode 210. The capacitor 212 is connected between the power supply output 500 and the input 217 to the gate 218. When the $I_L$ and M signals at the inputs to the NAND gate 216 are high, the input to the NAND gate 218 is immediately driven to a low level thereby charging the capacitor 212 through the diode 210. After the $I_L \cdot M$ signal at the output of the NAND gate 216 goes high, the capacitor 212 is discharged in accordance with the RC time constant of the resistor 214 and the capacitor 212. After the predetermined delay, the input 217 to the NAND gate 218 reaches a high level, again enabling the gate 218 to pass a TCS signal at 126. The RC time constant of the memory stage 176 is desirably chosen to be equal to or greater than any storage or delay time of the time-current signal generator 120 such that any TCS signal generated at 126 after the absence of the overcurrent will be inhibited.

While there have been illustrated and described various embodiments of the present invention, it will be apparent that various changes and modifications will occur to those skilled in the art. It is intended in the appended claims to cover all such changes and modifications as fall within the true spirit and scope of the present invention.

What is claimed and desired to be secured by Letter Patent of the United States is:

1. A control circuit responsive to the line current in an alternating-current line for providing a trip signal in the presence of overcurrents, the control circuit comprising:

signal generator means responsive to the line current for producing a control signal in the presence of overcurrents above a predetermined level and in accordance with a predetermined time-delay characteristic that exceeds the period of the alternating current and that is inversely related to the line current, said control signal being produced on a random basis with respect to the waveform of the alternating current; and decision control means for predicting whether or not the line current may develop instantaneous levels that will exceed a predetermined instantaneous current level $I_3$, said decision control means comprising means responsive to the occurrence of said control signal and one or more parameters of the line current for thereafter providing a trip signal in response to said control signal when it has been predicted that the line current will not develop instantaneous levels that will exceed the predetermined instantaneous current level $I_3$, and when it has been determined that the line current may develop instantaneous levels that exceed $I_3$, being responsive to the occurrence of said control signal and one or more parameters of the line current for thereafter providing a trip signal at a suitable point in the waveform of the alternating current such that a trip signal is generated when the line current is below a predetermined instantaneous current level $I_H$, where $I_3$ is greater than $I_H$.

2. The control circuit of claim 1 wherein said decision control means comprises means for predicting that the overcurrents will not have instantaneous levels that exceed the predetermined level $I_3$ based on said predetermined current level $I_H$.

3. The control circuit of claim 1 wherein said decision control means comprises means for predicting that the overcurrents will not have instantaneous levels that exceed the predetermined level $I_3$ based on the rate of change of the line current.

4. The control circuit of claim 1 wherein said decision control means comprises means for predicting that the overcurrents do not have instantaneous levels that exceed the predetermined level $I_3$ based on the rate of change of the line current and a predetermined current level $I_L$.

5. The control circuit of claim 1 wherein said decision control means comprises means for generating a signal representing that the line current may have recently exceeded a predetermined current level.

6. The control circuit of claim 1 wherein said decision control means comprises predicting means responsive to a rate threshold signal representing that the rate of change of the line current is greater than a predetermined threshold level and a signal representing a predetermined current $I_L$ which is less than $I_3$ for predicting whether or not an overcurrent is present that may have instantaneous current values that exceed $I_3$.

7. The control circuit of claim 6 wherein said predicting means further comprises means responsive to a signal representing that the instantaneous current is below said predetermined current $I_H$.

8. The control circuit of claim 6 wherein said predicting means further comprises memory means for maintaining for a predetermined time interval a prediction that the overcurrent may exceed said current level $I_3$.

9. The control circuit of claim 8 wherein said memory means is immediately set upon the occurrence of said rate threshold signal and said current level $I_L$.

10. The control circuit of claim 8 wherein said predetermined time interval is greater than the duration of a one-half cycle of the line current.

11. The control circuit of claim 8 wherein said signal generator means is characterized by a delay time defined by the response of the control signal to changes in the line current, said predetermined time interval being based on said delay time of said signal generator means.

12. The control circuit of claim 1 wherein said signal generator means includes a delay time defined by the delay in providing said control signal in response to changes in the line current, said control circuit further comprising means for disabling for a predetermined time interval the generation of said trip signal for overcurrents that do not exceed $I_3$, said predetermined time interval being greater than said delay time of said signal generator means, the start of said predetermined time interval being determined from one or more predetermined parameters of the line current.

13. The control circuit of claim 12 wherein said one or more predetermined parameters include the rate of change of the line current.

14. The control circuit of claim 13 wherein said one or more predetermined parameters further include the instantaneous magnitude of the line current.

15. The control circuit of claim 1 wherein said decision control means further comprises means for generating an energy storage control signal when an overcurrent exists that may have instantaneous levels that exceed $I_3$.

16. A control circuit responsive to the line current in an alternating-current line for providing a trip signal, the control circuit comprising:

signal generator means responsive to the line current in the alternating-current line for producing a control signal in the presence of overcurrents above a predetermined level and after the passage of a time delay that is inversely related to the line current and that is greater than the period of the alternating current; and decision control means responsive to the occurrence of said control signal and one or more parameters of the line current for thereafter generating a trip signal at a suitable point in the waveform of the alternating current such that a trip signal is generated only when the instantaneous level of the line current is less than a predetermined instantaneous current level $I_H$ and such that an inverse time-current characteristic is also provided that is inverse in the range of line currents that have instantaneous levels that exceed $I_H$.

17. The control circuit of claim 16 wherein said decision control means further comprises means responsive to the rate of change of the line current exceeding a predetermined level, said trip signal being generated upon the occurrence of said control signal, said line current being less than said current level $I_H$, and the rate of change of the line current exceeding a predetermined level.

18. The control circuit of claim 16 wherein said decision control means further comprises means responsive to the line current being greater than a predetermined current level $I_L$, said trip signal being generated upon the occurrence of said control signal, and said line current being greater than said current level $I_L$ and less than said current level $I_H$.

* * * * *

UNITED STATES PATENT AND TRADEMARK OFFICE
CERTIFICATE OF CORRECTION

PATENT NO. : 4,916,573

DATED : Apr. 10, 1990

INVENTOR(S) : Joseph W. Ruta

It is certified that error appears in the above-identified patent and that said Letters Patent is hereby corrected as shown below:

Col. 3, line 53, "over-currents" should be -- overcurrents -- (no hyphen);
Col. 7, line 48, "40" should be -- 400 --;
Col. 9, line 39, claim 4, "do" should be -- will --.

Signed and Sealed this

Fourteenth Day of May, 1991

Attest:

HARRY F. MANBECK, JR.

*Attesting Officer*     *Commissioner of Patents and Trademarks*